United States Patent [19]

Chu et al.

[11] Patent Number: 5,166,242
[45] Date of Patent: Nov. 24, 1992

[54] COATING COMPOSITION FOR APPLICATION TO A THERMOPLASTIC FILM FOR REDUCING THE COEFFICIENT OF FRICTION AND BLOCKING CHARACTERISTIC OF THE FILM WITHOUT REDUCING THE FILM'S TRANSPARENCY

[75] Inventors: Shaw-Chang Chu, Belle Meade, N.J.; Hee C. Park, Pittsford; Robert E. Touhsaent, Fairport, both of N.Y.

[73] Assignee: Mobil Oil Corporation, Fairfax, Va.

[21] Appl. No.: 582,049

[22] Filed: Sep. 14, 1990

Related U.S. Application Data

[62] Division of Ser. No. 150,179, Jan. 29, 1988, Pat. No. 4,981,758.

[51] Int. Cl.$^5$ .................. C08K 5/20; C08L 33/06; C08L 33/14
[52] U.S. Cl. .................. 524/238; 524/277; 524/558
[58] Field of Search ............ 524/238, 276, 277, 558, 524/556, 559

[56] References Cited

U.S. PATENT DOCUMENTS

| | | |
|---|---|---|
| 3,176,021 | 3/1965 | Volungis et al. |
| 3,412,059 | 11/1968 | Stickelmeyer et al. |
| 3,753,769 | 8/1973 | Steiner ............ 428/331 |
| 4,058,645 | 11/1977 | Steiner ............ 428/331 |
| 4,419,410 | 12/1983 | Weiner. |
| 4,419,411 | 12/1983 | Park. |
| 4,533,509 | 8/1985 | Gust et al. |
| 4,578,316 | 3/1986 | Clauson et al. |
| 4,618,527 | 10/1986 | Doyen. |
| 4,654,252 | 3/1987 | Doyen. |
| 4,749,616 | 6/1988 | Liu et al. ............ 428/331 |

FOREIGN PATENT DOCUMENTS 0254417  1/1988  European Pat. Off.

Primary Examiner—Christopher Henderson
Attorney, Agent, or Firm—Charles J. McKillop; Charles J. Speciale

[57] ABSTRACT

A coating composition for application to a thermoplastic film, such as polypropylene film, the coated film and the method for coating the film are disclosed. The coating composition includes an acrylic copolymer, a slip agent and, optionally, a water dispersible wax. The acrylic copolymer can be an emulsion or a solution. The acrylic copolymer preferably includes at least 5 weight percent of a polar, functional comonomer; has an average molecular weight of at least about 10,000; and has a glass transition temperature of about 30° C. to about 100° C.

8 Claims, No Drawings

COATING COMPOSITION FOR APPLICATION TO A THERMOPLASTIC FILM FOR REDUCING THE COEFFICIENT OF FRICTION AND BLOCKING CHARACTERISTIC OF THE FILM WITHOUT REDUCING THE FILM'S TRANSPARENCY

This is a division of co-pending application Ser. No. 150,179, filed on Jan. 29, 1988 which issued as U.S. Pat. No. 4,981,758 on Jan. 1, 1991.

BACKGROUND OF THE INVENTION

The present invention relates generally to coating compositions which can be applied to thermoplastic films and, more particularly, to a slip coating composition which, when applied to a thermoplastic film such as polypropylene, results in a film structure having low haze, low coefficient of friction and non-blocking characteristics.

While the present coating composition is suitable for application to a wide variety of thermoplastic films, it is especially suited for application to polypropylene films. Polypropylene films are widely used in the packaging industry due to their physical properties, such as, transparency, stiffness and excellent moisture barrier With all its good characteristics, unmodified polypropylene film also has the disadvantageous properties of high inherent coefficient of friction and film to film destructive blocking on storage.

In the past, coefficient of friction characteristics of polypropylene and other thermoplastic films have been beneficially modified by the inclusion of fatty acid amides in the polymer. This attempt at minimizing those shortcomings associated with unmodified polypropylene has been described in U.S. Pat. No. 3,176,021. Specifically, it is described that minor quantities of fatty acid amides can be incorporated into the polypropylene in order to improve the coefficient of In order, however, to obtain the benefits taught by the '021 patent, certain limitations must be observed. The film must be formed from a melt extruded at a temperature between about 400°–550° F. In addition, the amide must be present in from 0.005 to about 2.0 weight percent of the polypropylene, and it must be present along with from 0.1 to about 4.0 weight percent of polyethylene. Under these conditions and limitations, the resulting polypropylene film will have a static coefficient of friction no higher than 0.6 which is significantly higher than present day requirements. In addition, such a film does not have the high stereoregularity required by present day packaging demands. Further, it has been found that once the film has been subjected to temperature conditions approaching 140° F., the coefficient of friction increases significantly and is nowhere near the present day requirements of 0.25.

In addition to the foregoing limitations regarding fatty acid amide-containing polypropylene films, the effectiveness of the amides depends upon their ability to migrate to the surface of the films in order to reduce coefficient of friction. While such amides do improve the coefficient of friction of the films, the value of the coefficient of friction is subject to wide variation depending upon the heat history which the film experiences during shipping, storage, and certain converting processes. The presence of such amides on the film surfaces can adversely affect the film's appearance as manifested by an increase in haze, a decrease in gloss and the presence of streaks. The presence of such amides on the surface can also adversely affect the wettability and adhesion of solvent and water based inks, coatings and adhesives.

In the case of oriented polypropylene films, which are widely used in the food packaging industry, it is common to laminate this film with itself or with other thermoplastic films or with paper films such as glassine paper. When oleamide or erucamide are used in the polypropylene films a significant increase in coefficient of friction has been observed after lamination to such films It is theorized that this is due either to the migration of the amide back into the polypropylene film or to the loss of the additive layer at the film surface. Therefore, these types of oriented laminated polypropylene films have limited usage for particular converting processes. Attempts at replacing these amide types, in order to provide a consistent coefficient of friction, have not been successful.

Therefore, it is an object of the present invention to provide a coating composition for application to a thermoplastic film, such as polypropylene, whereby the resultant coated film is characterized by a reduced coefficient of friction.

It is another object of the present invention to provide such a coated film, which further exhibits non-blocking and improved slip characteristics.

It is yet another object of the present invention to provide such a coated film having stable non-blocking and improved slip characteristics with respect to the heat history experienced by the film during shipping, storage, converting processes and the like.

It is a further object of the present invention to provide such a film which is additionally characterized by improved clarity resulting from low haze.

SUMMARY OF THE INVENTION

In accordance with the present invention there is provided a coating composition for application to a thermoplastic film comprising an acrylic copolymer, a slip agent and, optionally, a water dispersible wax. The acrylic copolymer component can be an emulsion or a solution The coating composition preferably includes at least 5 weight percent of a polar, functional comonomer; has an average molecular weight of at least about 10,000; and a glass transition temperature of from about 30° C. to about 100° C. The slip agent included in the present coating composition can be a water soluble or water dispersible slip agent.

The present invention also provides a thermoplastic film structure which includes a thermoplastic film substrate and the afore-described coating composition applied to at least one side of the thermoplastic film substrate. Preferably, the thermoplastic film substrate is polypropylene.

In another aspect, the present invention relates to a method for producing a thermoplastic film structure which comprises:

(a) providing a thermoplastic film substrate; and (b) applying a coating composition comprising an acrylic copolymer, a slip agent and, optionally, a water dispersible wax to at least one side of the thermoplastic film substrate.

The application of the coating composition to at least one side of the thermoplastic film substrate preferably occurs between the steps of film orientation in the machine direction and film orientation in the transverse direction.

The resulting coated film of the present invention is characterized by a relatively low coefficient of friction. Advantageously, the coated film of the present invention further exhibits favorable non-blocking characteristics and possesses superior clarity because of its low degree of haze.

DESCRIPTION OF THE PREFERRED EMBODIMENTS

The film to be coated in accordance with the present invention can be selected from a variety of thermoplastic films. The most preferred film, however, is polypropylene film. While not wishing to be limited, the polypropylene film can be the highly stereoregular or highly crystalline type. These preferred polypropylene films are well known in the art and are formed by polymerizing polypropylene in the presence of stereospecific catalyst systems They can have a melt index at 230° C. ranging from about 1 to about 25. The crystalline melting point is about 160° C. The number average molecular weight ranges from about 25,000–100,000. The density ranges from about 0.90 to about 0.91.

Before the present coating composition is applied to the thermoplastic film, the film is oriented in the machine direction (MD). The resultant film is a biaxially oriented film, that is, it is first subject to MD orientation, and thereafter, is oriented in the transverse direction (TD). However, it is to be understood that the present coating composition is applied to the thermoplastic film between the steps of MD orientation and TD orientation.

The present coating composition includes, as a first component, an acrylic copolymer emulsion or solution. The first component includes at least 5 weight percent of a polar, functional comonomer based upon the total wt. of the 1st component. Preferably, the polar functional comonomer can be present in an amount of about 5 to about 60% and, most preferably, from about 10 to about 50%. The polar, functional comonomer of the first component can include acrylic acid, methacrylic acid, hydroxyethyl acrylate, hydroxyethyl methacrylate, hydroxypropyl acrylate, hydroxypropyl methacrylate, crotonic acid, fumaric acid, itaconic acid and maleic acid. The principal advantage for having the polar functional comonomer present in this amount is that the carboxylic acid or hydroxyl functional groups are expected to have hydrogen bonding interactions with the carboxylic salt group of the slip agent, and thus they behave as binding or anchoring agents for the slip additive.

The weight average molecular weight of the first component is at least about 10,000. Preferably, the weight average molecular weight of the first component is from about 20,000 to about 1,000,000 and, most preferably, from about 50,000 to about 500,000.

As the molecular weight of the first component is decreased to less than 10,000, the coating exhibits poor stretchability. On the other hand, as the molecular weight is increased above 1,000,000, the coating exhibits poor flow characteristics.

The first component will have a glass transition temperature of from about 30° C. to about 100° C. Preferably, the glass transition temperature of the first component will be from about 40° C. to about 90° C. and, most preferably, between 50° C. to about 80° C.

As the glass transition temperature of the first component is decreased to less than 30° C., the coating has a tendency to block. On the other hand, the coating becomes brittle as the glass transition temperature is increased above 100° C.

The second component of the present coating composition is a water soluble or water dispersible slip agent. The second component is present in an amount of from about 10% to about 90% and, preferably, from about 20% to about 80% based upon the total weight of the 1st and 2nd components.

The second component can be selected from N-acyl sarcosines, such as, lauoroyl sarcosine or the salts of N-acyl sarcosines, such as sodium lauoroyl sarcosinate.

The coating composition can optionally include a water dispersible wax as a third component. The third component can be in an amount up to about 20% and, preferably, from about 5% to about 15% based upon the total weight of the 1st and 2nd components. The third component can be selected from carnuba wax, microcrystalline wax, polyethylene wax, and their blends.

The coating can be applied to the thermoplastic film, after MD orientation, in any conventional manner. Preferably, however, the coating is applied by a gravure roll coating process whereby a single or coextruded layer of a thermoplastic film, such as polypropylene, is extruded, solidified, and thereafter, oriented in the MD. The coating composition can thereafter be roll-coated on the already MD oriented base polypropylene film. The coated film is subsequently oriented in the TD utilizing, for instance, a tentering device.

The following examples serve to provide a further appreciation of the invention but are not intended, in any way, to restrict the effective scope of the invention.

EXAMPLE 1

An aqueous coating dispersion was prepared by combining deionized water; aqueous ammonia; an acrylic acid copolymer, sold under the name Acrysol ASE60 by Rohm & Haas Co., Philadelphia, Pa.; sodium lauroyl sarcosinate, sold under the name Hamposyl L-30 by W. R. Grace Co., New York, N.Y.; Carnuba wax emulsion sold under the name Michem Lube 156 by Michelman, Inc. and aqueous ammonia. Each of the components listed above were used in the amounts indicated below in Table I.

TABLE I

| Component | | Parts By Weight |
| --- | --- | --- |
| Deionized Water | | 2412.0 |
| Aqueous Ammonia | (7.36%) | 21.3 |
| Acrysol ASE60 | (28%) | 201.9 |
| Hamposyl L-30 | (30%) | 765.0 |
| Michem Lube 156 | (25%) | 153.0 |
| Aqueous Ammonia | (7.36%) | 51.6 |
| | | 3604.8 |

This list of components requires further explanation.

The resulting coating dispersion has a solids content of 9.0%, a pH of 9.0 and a Viscosity (Brookfield) of 130 centipoise. If necessary, the solids content and viscosity can be further reduced to adjust the coating weight.

The coating dispersion was placed in a gravure coater which had been installed between the MD orienter and the TD orienter of a pilot scale film orienter Polypropylene resin (Fina W-472) was extruded through a flat sheet die at 250° C., cast onto a cooling drum and quenched at 30° C. The sheet, which had measured about 35 mils thick, was reheated to 140° C. and stretched 5-fold in the MD, and thereafter, corona-treated for improved surface wettability. The MD oriented film web, when passing through the gravure coater, was coated with the coating dispersion. The coated web was dried in pre-heat zones at 160° C. and subsequently stretched 8-fold in the TD at 145° C. and annealed at 160° C. The finished film, which had measured about 0.8 mil thick, was corona-treated on the uncoated side to improve the wettability and adhesion of ink and adhesives that might be subsequently applied thereon. The coated film exhibited the properties indicated in Table II.

TABLE II

| | |
|---|---|
| COF: | 0.1–0.25 |
| Blocking: | 1–3 g/inch |
| Haze: | 1–2.5% |
| Gloss at 45° angle | 80–90% |
| Coating Weight: | 0.01–0.3 mg/in$^2$ |

EXAMPLES 2-6

A series of coating compositions were prepared in the manner described in Example 1. In these compositions, the weight ratio of Acrysol ASE60/Hamposyl L-30 was varied as indicated in Table III.

TABLE III

| Example | Acrysol ASE60/Hamposyl L-30* | COF |
|---|---|---|
| 2 | 66/34 | 0.25 |
| 3 | 50/50 | 0.17 |
| 4 | 34/66 | 0.13 |
| 5 | 20/80 | 0.19 |
| 6 | 10/90 | 0.26 |

*Weight ratio on dry basis.

As these data demonstrate, a low coefficient of friction can be obtained over a broad range of Acrysol/Hamposyl ratios.

COMPARATIVE EXAMPLES (7-10)

The Examples indicated below in Table IV were conducted in accordance with the same conditions as the Examples discussed above. However, in Examples 7-10 the coating composition was altered as indicated below in Table IV.

TABLE IV

| Example | Coating Composition | COF |
|---|---|---|
| 7 | Prepared in the same manner as Example 1, except that the acrylic acid Copolymer (Acrysol) was excluded and replaced by Sodium Lauroyl Sarcosinate (Hamposyl) on the same weight basis. | 0.43 |
| 8 | Prepared in the same manner as Example 1, except that the Hamposyl was excluded and replaced by Acrysol on the same weight basis. | 0.50 |
| 9 | Prepared in the same manner as Example 1, except that that Acrysol was replaced by hydroxyethyl cellulose on the same weight basis. | * |
| 10 | Prepared in the same manner as Example 1, except Acrysol was replaced by an acrylic copolymer having a glass transition temperature (Tg) similar to Acrysol (at approximately 80° C.) but which contains only 1% by weight of methacrylic acid. | 0.38 |

*Coating cracked as a result of its poor stretchability.

Thus, as these data demonstrate, in Example 7 where the acrylic acid copolymer was eliminated from the coating composition, the coated film was characterized by a relatively high COF.

In Example 8, where the sodium lauroyl sarcosinate was eliminated from the coating composition, the coated film was characterized by an even higher COF than that of the film of Example 7.

Comparative Examples 9 and 10 further demonstrate the superiority of the coated films of Examples 1 to 6.

Thus, while there have been described what are presently believed to be the preferred embodiments of the present invention, those skilled in the art will realize that changes and modifications may be made thereto without departing from the spirit of the present invention, and it is intended to claim all such changes and modifications which may fall within the true scope of the invention.

What is claimed is:

1. A coating composition for application to a thermoplastic film for reducing the coefficient of friction and blocking characteristics of the film without reducing the transparency of the film, comprising an acrylic copolymer having a polar, functional comonomer selected from the group consisting of acrylic acid, methacrylic acid, hydroxyethyl acrylate, hydroxyethyl methacrylate, hydroxypropyl acrylate, hydroxypropyl methacrylate, crotonic acid, fumaric acid and maleic acid; and a water soluble slip agent selected from the group consisting of N-acyl sarcosines, and salts thereof, and a water dispersible wax selected from the group consisting of carnauba wax, microcrystalline wax, polyethylene wax, and their blends.

2. The coating composition of claim 1 wherein said acrylic copolymer is derived from an acrylic copolymer emulsion.

3. The coating composition of claim 1 wherein said acrylic copolymer is derived from an acrylic copolymer solution.

4. The coating composition of claim 1 wherein said acrylic copolymer comprises at least 5 weight percent of a polar, functional comonomer.

5. The coating composition of claim 1 wherein said acrylic copolymer comprises from about 5 to about 60 weight percent of a polar, functional comonomer.

6. The coating composition of claim 1 wherein said acrylic copolymer has an average molecular weight of at least about 10,000.

7. The coating composition of claim 1 wherein said acrylic copolymer has an average molecular weight of about 10,000 to about 1,000,000.

8. The coating composition of claim 1 wherein said acrylic copolymer has a glass transition temperature of about 30° C. to about 100° C.

* * * * *